United States Patent
Julien et al.

(10) Patent No.: US 11,431,852 B2
(45) Date of Patent: Aug. 30, 2022

(54) ENHANCED BUILT-IN VOICEMAIL FOR USER EQUIPMENT

(71) Applicants: Charles Julien, St-Jean-sur-Richelieu (CA); Maxime Mathieu, Longueuil (CA)

(72) Inventors: Charles Julien, St-Jean-sur-Richelieu (CA); Maxime Mathieu, Longueuil (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/265,059

(22) PCT Filed: Aug. 1, 2018

(86) PCT No.: PCT/IB2018/055794
§ 371 (c)(1),
(2) Date: Feb. 1, 2021

(87) PCT Pub. No.: WO2020/026003
PCT Pub. Date: Feb. 6, 2020

(65) Prior Publication Data
US 2021/0306462 A1    Sep. 30, 2021

(51) Int. Cl.
*H04M 3/533*     (2006.01)
*H04W 4/16*      (2009.01)
*H04M 1/72433*   (2021.01)

(52) U.S. Cl.
CPC ....... *H04M 3/533* (2013.01); *H04M 1/72433* (2021.01); *H04W 4/16* (2013.01)

(58) Field of Classification Search
CPC ............. H04M 3/533; H04M 1/72433; H04M 2203/4563; H04W 4/16
See application file for complete search history.

(56) References Cited

U.S. PATENT DOCUMENTS

| | | | | |
|---|---|---|---|---|
| 6,002,751 A | * | 12/1999 | Shaffer | H04M 3/53325 |
| | | | | 379/88.13 |
| 8,488,752 B1 | * | 7/2013 | Wiesen | H04M 1/72433 |
| | | | | 379/374.03 |

(Continued)

FOREIGN PATENT DOCUMENTS

| CN | 101345798 A | 1/2009 |
|---|---|---|
| CN | 101772948 A | 7/2010 |

(Continued)

OTHER PUBLICATIONS

J. Rosenberg et al., SIP: Session Initiation Protocol, Network Working Group, Request for Comments 3261, Jun. 2002.

(Continued)

*Primary Examiner* — Minjung Kim
(74) *Attorney, Agent, or Firm* — Alex Nicolaescu; Ericsson Canada Inc.

(57) ABSTRACT

A User Equipment (UE) for handling voice or video calls, such as for example a smartphone, PC, laptop, tablet, etc, has a voicemail client integrated in its OS, or in the form of an app, configured to receive an incoming call message causing an alert about the incoming call for at most a pre-set no-answer period of time, after which, if the call is not answered, the call being set to be completed from the calling party towards a network-based voicemail center, and before the expiry of the pre-set no-answer period of time, to answer the incoming call, causing the call to be established between the calling party and the UE's voicemail client, wherein the call is not completed towards the network-based voicemail center. The voicemail client is further configured to play a greeting message for the calling party over the call with the calling party, record a voice message from the calling party, and alert the user of the UE about the voicemail message, using the UE's voicemail client. Voicemail messages are (Continued)

Figure 2:
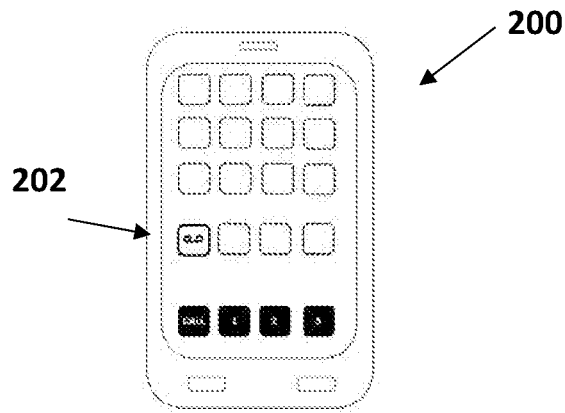

thus saved and accessed locally on the UE avoiding the signaling to a network-based voicemail client.

25 Claims, 5 Drawing Sheets

(56) References Cited

U.S. PATENT DOCUMENTS

| | | | |
|---|---|---|---|
| 8,644,801 B1* | 2/2014 | Nassimi | H04M 3/533 |
| | | | 455/412.2 |
| 9,042,869 B2 | 5/2015 | Bulgin | |
| 2003/0119487 A1* | 6/2003 | Silvester | H04M 11/10 |
| | | | 455/412.1 |
| 2003/0152201 A1* | 8/2003 | Snelgrove | H04W 4/12 |
| | | | 379/88.22 |
| 2009/0016242 A1 | 1/2009 | Kakiuchi | |
| 2009/0061827 A1 | 3/2009 | Bulgin | |
| 2010/0061530 A1* | 3/2010 | Liu | H04M 3/42221 |
| | | | 379/88.25 |
| 2010/0166161 A1* | 7/2010 | Dhawan | H04M 1/642 |
| | | | 379/88.19 |
| 2010/0189232 A1 | 7/2010 | Shimazaki | |
| 2014/0112457 A1* | 4/2014 | Xing | H04M 3/436 |
| | | | 379/32.01 |
| 2014/0128038 A1* | 5/2014 | Abou Rjeili | H04W 4/16 |
| | | | 455/413 |
| 2016/0127551 A1* | 5/2016 | Scott | H04M 3/533 |
| | | | 455/413 |
| 2018/0109681 A1 | 4/2018 | McLean, Jr. | |
| 2020/0112635 A1* | 4/2020 | Scott | H04M 1/724 |

FOREIGN PATENT DOCUMENTS

| | | |
|---|---|---|
| CN | 102215463 A | 10/2011 |
| CN | 105530389 A | 4/2016 |

OTHER PUBLICATIONS

S. Donovan, The SIP INFO Method, Network Working Group, Request for Comments 2976, Oct. 2000.

ISR and Written opinion from corresponding application PCT/IB2018/055794.

* cited by examiner

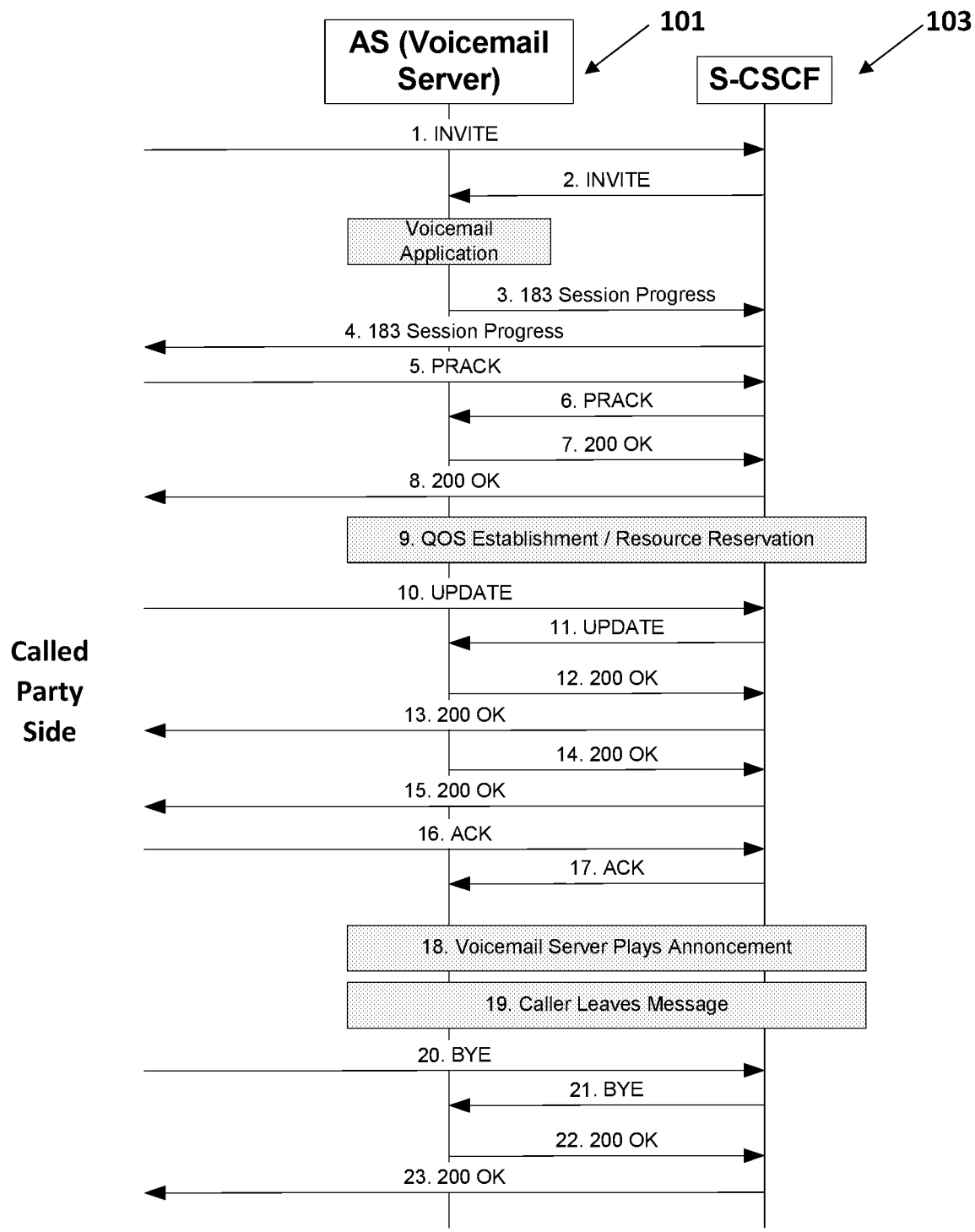
Figure 1.a (Prior Art)
*Voicemail server records messages*

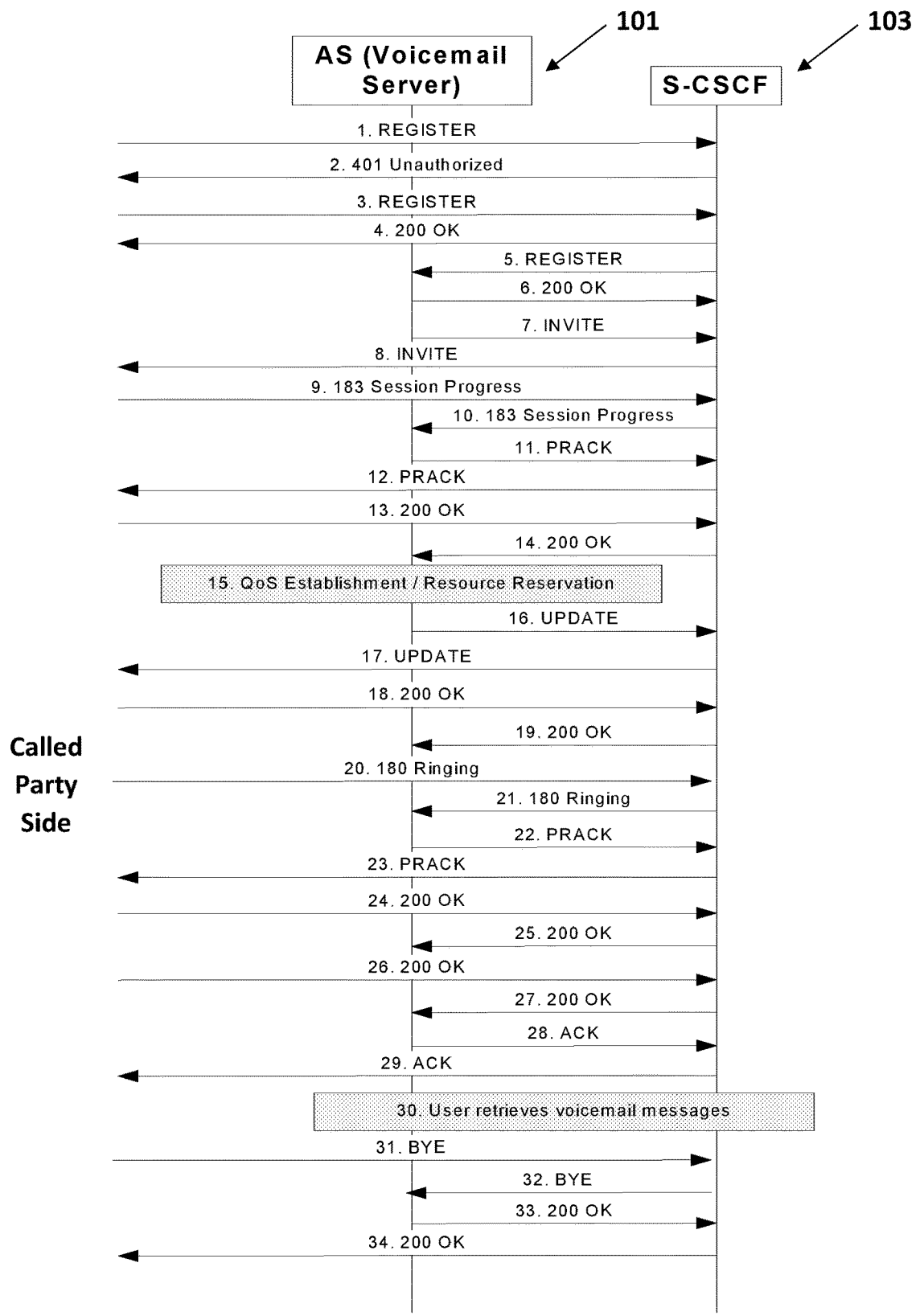
Figure 1.b (Prior Art)
*Upon registration voicemail server replays messages*

not needed

ENHANCED BUILT-IN VOICEMAIL FOR USER EQUIPMENT

TECHNICAL FIELD

The present disclosure relates to voice mail systems.

BACKGROUND

Voice mail systems allow a calling party to leave a voice message to an unavailable called party.

It was the fixed telephony that for the first time offered callers a way to leave a voice message to a called party, via an answering machine usually connected to the called party telephone line. After a period of time of telephone phone ringing, if the called party did not pickup the telephone, the answering machine played a greeting message inviting the calling party to leave a voice message to the called party. The later would listen to the deposited message at a later point in time.

A further enhancement of the concept was the implementation of network-based answering machines in fixed telephony. No longer did the called party need to buy and set-up an answering machine at home, because the fixed telephony operator allowed the service to be network-based, i.e. when the called party did not take the call after a certain period of time, the call was rerouted to a network-based voicemail server that played the greeting and saved the calling party's voice message. Then the called party could then dial-in to the network-based voicemail server to listen to the deposited message.

Cellular telephony also implemented voicemail messaging enabling calling parties to leave messages for the called parties.

In GSM (Global System for Mobile Communications) for example, voicemail is handled via a call forwarding service (with various triggers associated with the called party, such as for example forwarding on busy, on no reply/answer, on inactive, etc.) to a transfer number (C-number).

When the call from the calling party arrives at the Visited MSC, the MSRN (Mobile Station Roaming Number) is used to determine the phone being called, i.e., the MSRN maps back to the IMSI (International Mobile Subscriber Identity) of the called party. The MSC (Mobile Switching Center) pages all the base stations in the area where the IMSI is registered, in order to inform the called party phone that there is an incoming call for it. If the called party subscriber answers, a speech path is then established through the Visited MSC and Gateway MSC back to the network of the calling party, and a normal call follows. But if the called party subscriber does not answer (e.g. the subscriber is busy on another call (and call waiting is not used), the Visited MSC routes the incoming call to a pre-determined Call Forward Busy (CFB) number, which is in the present scenario the number of the voicemail server. CFB forwarding occurs as soon as the call is detected, and the call delivery process determines that the subscriber is busy and has no call waiting.

Similarly, if the subscriber does not answer the call after a period of time (for example 30 seconds) then the Visited MSC routes the call to the pre-determined Call Forward No Reply (CFNRy) number. The operator may decide to set this value by default to the voicemail server of the mobile so that the voicemail server is contacted, and callers can leave messages for called parties.

Further, in yet another scenario, if the subscriber does not respond to the paging request, either due to being out of coverage, or their battery has gone flat/removed, then the Visited MSC routes the call to a pre-determined Call Forward Not Reachable (CFNRc) number. Once again, the operator may decide to set this value by default to the voicemail server of the mobile so that callers can leave a message.

When the terminating side is set to be the voicemail system, the call is established between the calling party and the voicemail system, which plays the greeting for the user inviting the user to leave a voice message. When this is accomplished, after the message is successfully recorded, the voicemail system alerts the called party of the existence of a recorded message, via SMS or MMS, usually. Whenever the called party wishes, it can call the voicemail server to listen and manage (e.g. discard, replay, store) the deposited voice message(s).

Therefore, in GSM the redirection of the call to the voicemail server occurs either immediately when the called party is busy on another line and has no call waiting feature activated, but more often than not after the expiry of the pre-set time period of time for the user to pick up the call, like in the CFNRy or CFNRy scenarios.

Such pre-set period of time may be set-up by the network operator or by the subscriber itself.

Newer cellular systems also implement the voicemail service via IMS (IP Multimedia Subsystem). In IMS, the SIP (Session Initiation Protocol) is used for signaling between the parties.

FIG. 1.a (Prior Art), shows an IMS-based scenario implementing a voicemail system in an application server 101, which acts as a terminating UA (User Agent) and performs the function of a Voicemail Server in order to terminate a call and record a message on behalf of a UE that is out of coverage or powered off.

An initial INVITE 1 destined for a UE (User Equipment, not shown) that is not currently IMS-registered is forwarded to an S-CSCF (Serving Call Session Control Function) 103. The Default Filter Criteria in the S-CSCF 103 indicates that for the case of an unregistered user the INVITE request should be forwarded to the Voicemail and Announcement Server 103.

Upon receiving the INVITE request 1, the Voicemail and Announcement Server 101 determines that the destination UE has subscribed to the Voicemail Service (possibly by downloading some subscriber profile information via an Sh interface, not shown). The Voicemail and Announcement Server 101 therefore in addition to playing an announcement to inform the calling party that the called party is either powered off or out of coverage also informs the caller that he may leave a message for the called party.

The calling party leaves a message for the called party and then hangs up the call by sending a BYE request.

In more details, shown in FIG. 1 (Prior Art) are the following steps:

1) INVITE request destined for an unregistered user is received at the S-CSCF.

2) Based on trigger point of the initial Filter Criteria S-CSCF proxies the INVITE request to the AS (Voicemail Server).

3-4) The AS starts the voicemail application and responds with a 183 (Session Progress) response containing SDP which is proxied back to the caller by the S-CSCF.

5-8) The caller responds with a PRACK request containing SDP, which the S-CSCF proxies to the AS and the AS responds with a 200 (OK) response containing SDP which the S-CSCF proxies back to the caller.

9) QOS establishment and resource reservation takes place.

10-13) After completing resource reservation the caller sends a UPDATE request containing SDP which is proxied by the S-CSCF to the AS which responds with a 200 (OK) response containing SDP which is proxied back to the caller by the S-CSCF.

14-15) The AS then sends a 200 (OK) response to the initial INVITE request which the S-CSCF proxies to the caller.

16-17) The caller returns an ACK request to the 200 (OK) response.

18) The AS plays an announcement using the session established indicating that the caller is powered off but that the caller may leave a message.

19) The caller leaves a message using the session established.

20-21) The caller hangs up by sending a BYE request which the S-CSCF proxies to the AS.

22-23) The AS responds with a 200 (OK) response, which the S-CSCF proxies back to the caller.

FIG. 1.b (Prior Art) shows the scenario when the voicemail server 101 contacts the user upon registration with the network, informing him of any recorded messages. The Application Server's use of the MRF to play announcements and to select and play the recorded messages is not shown in this example.

In details, the steps of FIG. 1.b (Prior Art) are as follows:

1-4) The UE sends a REGISTER request to the S-CSCF 103 which authenticates with a 401 (Unauthorized) response challenge with the authentication response being supplied in a second REGISTER request. The registration completes with a 200 (OK) response from the S-CSCF to the UE.

5-6) The S-CSCF downloads Filter Criteria for the UE from the HSS which indicates the S-CSCF should send a third-party REGISTER request on behalf of the UE to an AS that performs a voicemail service. The AS responds to the REGISTER request with a 200 (OK) response.

7-8) The AS downloads subscriber data for the subscriber (possibly from the HSS via the Sh interface) that indicates that the subscriber has enabled a feature that has the voicemail application contact the subscriber upon registration to deliver recorded messages. The AS sends an INVITE request containing SDP for the UE to the S-CSCF which proxies it to the UE.

9-10) The UE responds with 183 (Session Progress) response containing SDP which the S-CSCF proxies to the AS.

11-14) The AS sends a PRACK request, which the S-CSCF proxies to the UE and the UE respond with a 200 (OK) response which the S-CSCF proxies to the AS.

15) QOS establishment and resource reservation takes place.

16-19) The AS sends an UPDATE request, which the S-CSCF proxies to the UE and the UE responds with a 200 (OK) response which the S-CSCF proxies to the AS.

20-21) The UE sends a 180 (Ringing) response indicating that it is alerting the user which the S-CSCF proxies to the AS.

22-25) The AS to indicate receipt of the 180 (Ringing) response sends a PRACK request which the S-CSCF proxies to the UE and the UE responds with a 200 (OK) response which the S-CSCF proxies to the AS.

26-27) When the subscriber answers the UE sends a 200 (OK) response to the initial INVITE request which the S-CSCF proxies to the AS.

28-29) The AS acknowledges the 200 (OK) response with an ACK request which the S-CSCF proxies to the UE.

30) The AS plays an announcement indicating the number of messages stored and then plays back the messages to the UE using the session established.

31-32) The UE hangs up by sending a BYE request, which the S-CSCF proxies to the AS.

33-34) The AS responds with a 200 (OK) response, which the S-CSCF proxies back to the UE.

In short, various network-based implementations are proposed in the prior art to implement voicemail systems. However, every such implementation requires the setup of costly network-based servers and technology, both in terms of storage space to address the storage needs of a significant numbers of voicemail messages for all subscribers in a given network, and signaling and data transfer, as such voice messages need to first be exchanged between the called party and the network-based voicemail server, and then further exchanged between the later and the called party.

Even Voice over IP System (VoIP) use similar concepts. Skype™ also allows for the deposition of the voicemail messages in a network-based server and notifies the user upon re-registration of the existence of the voicemail message, enabling it to be then downloaded and listened. This also requires implementation of data storage space in the Skype™ network servers, and takes bandwidth of the network, twice, as mentioned hereinbefore.

The fixed telephony answering machine scenario also requires additional investment, as the user needs to buy and set up the answering machine.

There is a need for a simpler and more effective solution that addresses the above-mentioned drawbacks.

SUMMARY

In one aspect, embodiments of the invention include, in a User Equipment (UE) comprising circuitry enabling handling of phone calls, a method for voicemail service. The method allows receiving an incoming call message causing a UE's call client to alert about the incoming call for at most a pre-set no-answer period of time, after which, if the call is not answered, the call being set to be completed from the calling party to a network-based voicemail center. Then, before the expiry of the pre-set no-answer period of time, the method enables answering the incoming call by a voicemail client of the UE, causing the call to be established between the calling party and the UE's voicemail client, wherein the call is not completed to the network-based voicemail center. The method further allows greeting message to be played for the calling party by the voicemail client over the call with the calling party, for the recording a voice message from the calling party on the UE using the UE's voicemail client; and for the alerting the user of the UE of the voicemail message.

In another aspect, embodiments of the invention provide for a User Equipment (UE) comprising circuitry configured to handle phone calls, the UE being configured to receive an incoming call message causing a UE's call client to alert about the incoming call for at most a pre-set no-answer period of time, after which, if the call is not answered, the call being set to be completed from the calling party towards a network-based voicemail center; before the expiry of the pre-set no-answer period of time, answer the incoming call by a voicemail client of the UE, causing the call to be established between the calling party and the UE's voicemail client, wherein the call is not completed towards the network-based voicemail center. The UE is further configured to play a greeting message for the calling party by the voicemail application over the call with the calling party, record a voice message from the calling party on the UE using the UE's voicemail client; and alert the user of the UE about the voicemail message.

Recording the voice message further comprises determining when the call is answered by the user during the playing of the greeting message or the recording of the voicemail message, and transferring the call from the voicemail client of the UE and enabling the user to speak to the calling party.

Receiving the incoming call message may comprise receiving a call page from a Mobile Switching Center (MSC) and alerting about the incoming call comprises playing a ringing sound or generating a vibration by the UE.

Furthermore, receiving the incoming call message comprises receiving a Session Initiation Protocol (SIP) INVITE message from a SIP media center.

In other aspects, the invention allows for configuring the voicemail client to answer incoming calls not answered by the user, before the expiry of the pre-set no-answer period of time, to avoid the incoming calls being routed to the network-based voicemail server. Configuring the voicemail client of the UE may include obtaining from the network-based voicemail server the pre-set no-answer period of time, or manually configuring the pre-set no-answer period of time. Configuring the voicemail client of the UE may also include configuring a period of time smaller than the pre-set no-answer period of time at which expiry the call is to be answered by the UE's call client if the call is not answered by the user.

Once the voicemail message is recorded on the UE, embodiments of the invention allow for displaying the voicemail message in a visual voicemail inbox of the UE.

In a further aspect, embodiments of the invention include downloading from the network-based voicemail center other voicemail messages deposited onto the network-based voicemail center, during a period of time the UE was turned off or otherwise unreachable, wherein displaying comprises displaying the voicemail message in the visual voicemail inbox of the UE along with the other voicemail messages.

In yet a further aspect, embodiments of the invention provide for the voicemail client to be part of the operating system of the UE, or alternatively to be an app running on top of the operating system of the UE.

The UE may be a smartphone, a PC, a laptop, a tablet or a computer device.

DRAWINGS

Figure 3:
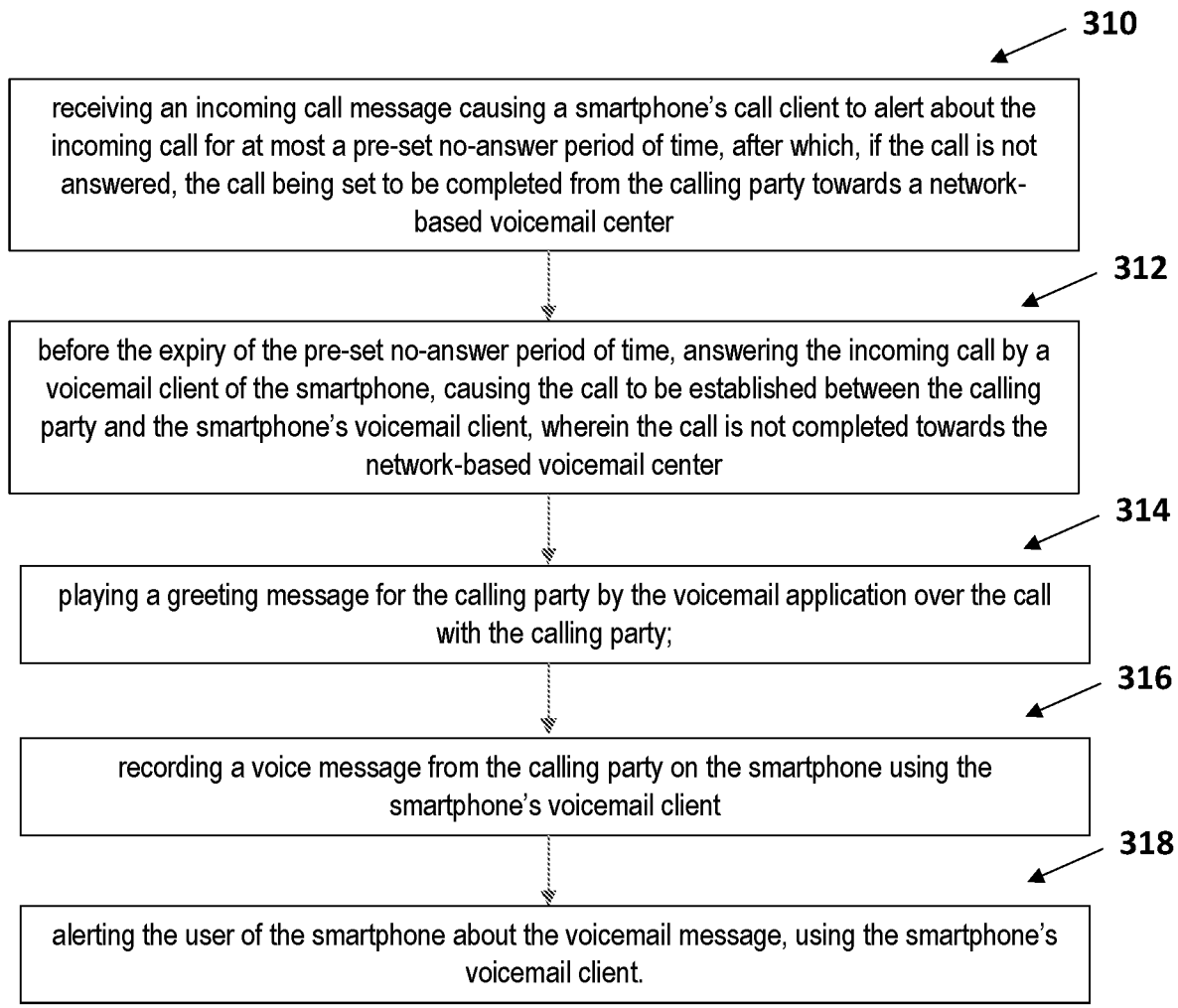
Figure 4:
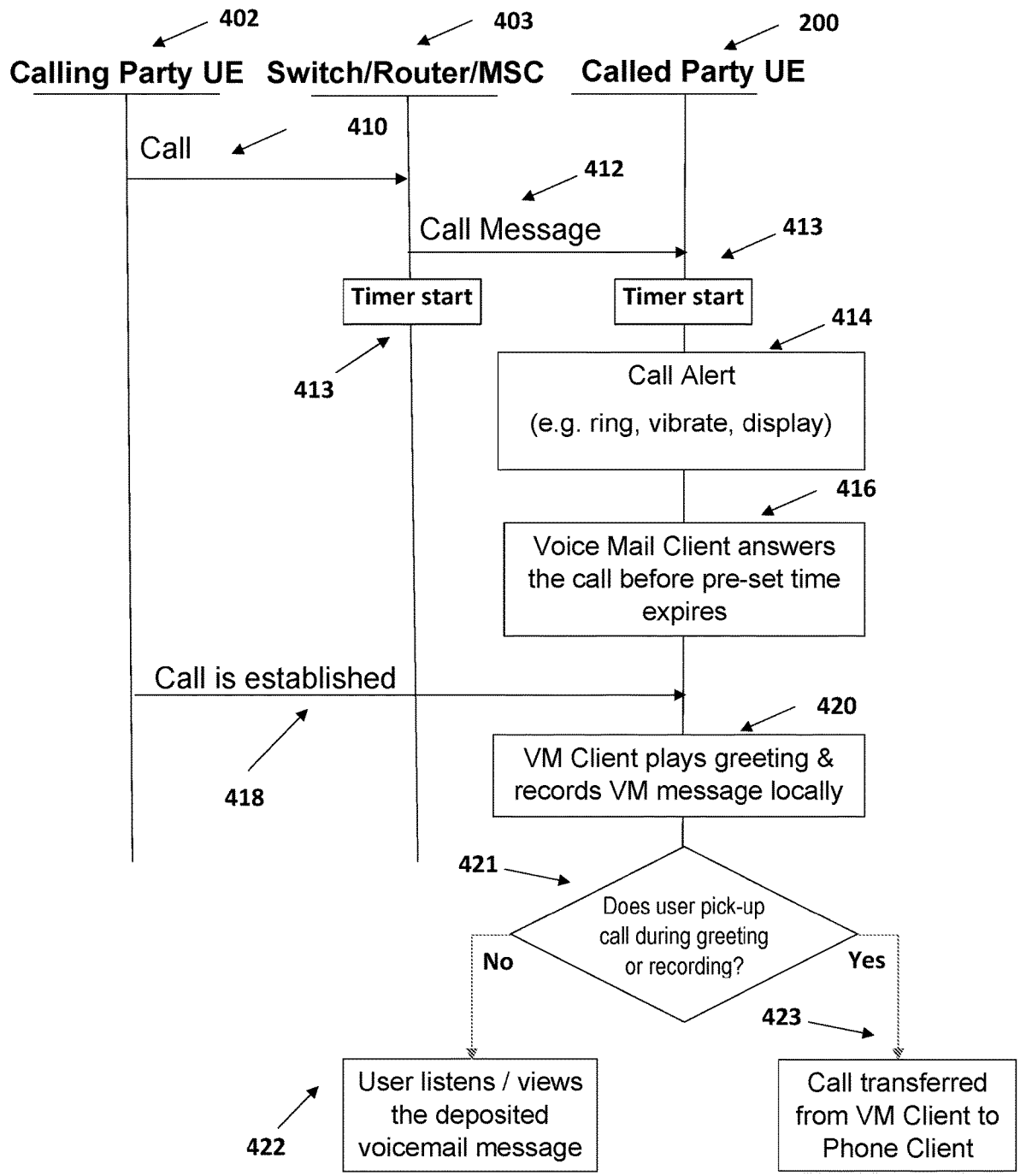
Figure 5:
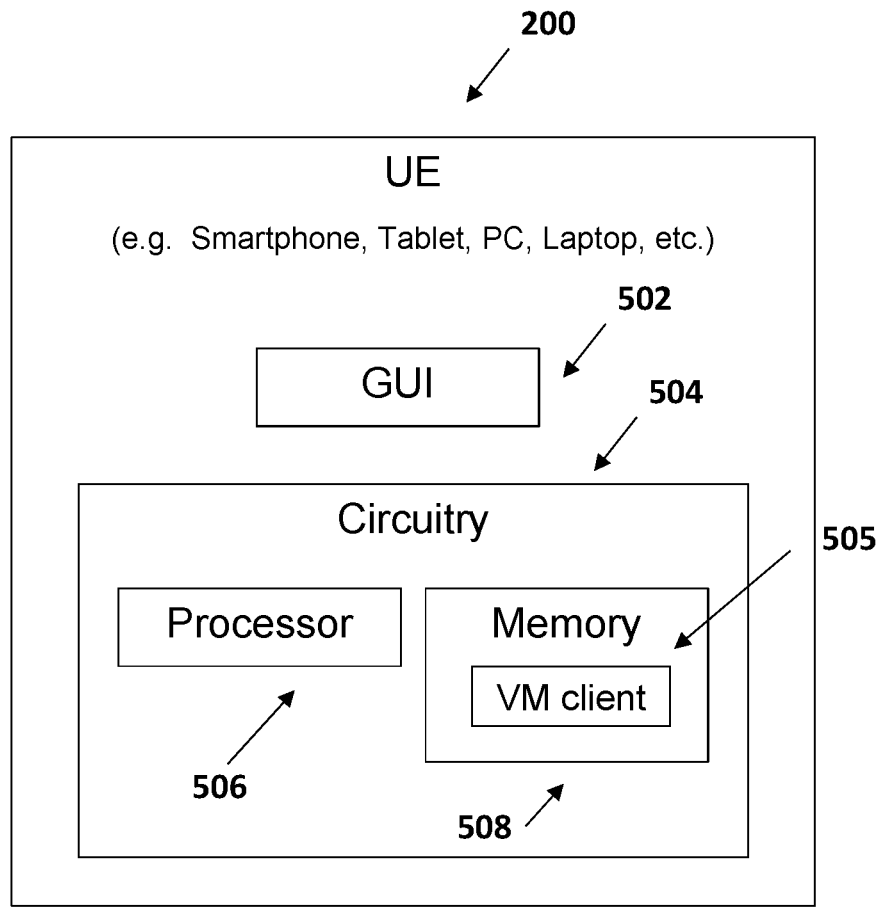

For a more detailed understanding of the invention, for further objects and advantages thereof, reference can now be made to the following description, taken in conjunction with the accompanying drawings, in which:

FIG. 1.*a* (Prior Art) is a nodal operation and signal flow diagram of an IMS-based scenario implementing a voicemail system;

FIG. 1.*b* (Prior Art) is another nodal operation and signal flow diagram of another IMS-based scenario implementing a voicemail system;

FIG. 2. is an exemplary high-level illustration of a UE implementing embodiments of the present invention;

FIG. 3. is an exemplary flowchart diagram of a method implementing certain embodiments of the invention;

FIG. 4. is an exemplary nodal operation and signal flow diagram representative of certain embodiments of the invention; and FIG. 5. is an exemplary block diagram of a UE according to certain other embodiments of the invention.

DETAILED DESCRIPTION

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

Embodiments of the present invention propose a voicemail solution in the form of an application or client on a User Equipment (UE), that may include for example a smartphone, PC, laptop, tablet, or any other type of computer device for handling voicemail messages locally on the called party's UE. In so doing, embodiments of the invention avoid the need for interaction with traditional network-based voicemail servers because the call is always answered at the called party's side, by the voicemail client of the UE, even when the user is busy, unavailable, etc.

According to embodiments herein, in such an instance, the B-Party (the Called Party)'s UE is provided with a voicemail (VM) client (which may or may not be part of the native OS of the UE) that runs on the UE and takes care of intercepting the voice call before the expiry of the "call busy" or "no answer" period as already set up on the UE or its network. Because the call is always answered before the expiry of the non-answer period, there is no no-answer message sent back to the MSC/switch and hence the VM centre/server is not contacted. Rather, the local VM client mimics the user's answering the call before the expiry of the no-answer time period set for rerouting the call to the network-based VM server, which triggers the establishment of the voice call (via the voice channel in GSM, for example) with he called party's UE voicemail client, and then allows the establishment of a regular voice call with the A party (the calling party) on behalf of the user. The VM client plays a user greeting to offer the A-Party to deposit the voicemail message, and records the voice message directly on the UE of the called party.

All preconditions are thus negotiated directly with the UE voicemail client and consequently, the voice message is recorded directly on the UE and presented in the VM client of the user. Embodiments of the invention may be implemented in Operating Systems (OS)'s such as for example Android™ and/or Apple's IOS™ to avoid end-users to enable or to install other kind of application from their relative "play" or "app" store.

Alternatively, in other embodiments, the feature may also be implemented in an app available on app stores, which may be downloaded and run on top of the UE's OS.

According to embodiments herein, the voicemail message deposit is the result of a phone redirection (B-Party is unable to take the voice call) towards B-Party's own UE voicemail client. Because embodiments of the invention are only implemented at the terminating side, i.e. in the UE of the called party, GSM, SIP, or other communications protocol may continue to be used without modifications. All typical Voicemail features continue to work, while according to embodiments herein, the UE itself becomes its own voicemail server.

In addition to these embodiments, in certain implementations, the operator's voicemail server may still be made available to serve non-UE users that cannot use this new client, or to offer a voicemail fall-back solution to those users using the voicemail client but have their phone is turned off or not reachable. After turning on the phone, for example, the application could then sync with the voicemail server and copy the non-read voicemail messages over IMAP (Internet Message Access Protocol), for example, similarly to how Visual Voicemail is working.

Also, some configurations of the voicemail client of the UE may be offered so that for example, the client would redirect to the operator's voicemail server when B-Party is roaming and not answering, to avoid (potentially expensive) call time charges to be incurred.

Finally, according to other embodiments, it should also be possible for the called party to take over the incoming voicemail call being deposited onto the called party UE and talk to the A-Party directly when freed-up during the voicemail message deposition. The voicemail client, for example, may alert or otherwise let the B-party know that a voicemail is presently being deposited and offer the possibility to pick up the voice call if desired (therefore cancelling the deposit—or not, depending on configuration parameters).

FIG. 2 shows a high-level illustration of an exemplary UE 200 implementing embodiments of the present invention. The UE implements the voicemail client proposed herein, which may be accessible to the user via an app icon 202 as shown. The voicemail client may be fully or partially integrated with the OS of the UE 200 or not. It may be an integral part of the call client of the UE 200, or implemented as a separate function or app.

FIG. 3 shows a high-level flowchart diagram of a method proposed by exemplary embodiments of the invention. According to such exemplary embodiments, the UE 200 is configured to receive calls and comprises circuitry enabling handling of such calls. The method starts in action 310 when the called party UE receives an incoming call message causing the UE's call client (also called app herein) to alert (e.g. via ringing, vibrating, or flashing) about the incoming call for at most a pre-set no-answer period of time, after which, if the call is not answered, the call being set to be completed from the calling party towards a network-based voicemail centre. In action 312, before the expiry of the pre-set no-answer period of time, according to embodiments herein, the incoming call is answered by the voicemail client of the UE 200, causing the call to be established between the calling party and the UE's voicemail client, so that the call is not completed towards the network-based voicemail centre. Then, the UE voicemail client plays a greeting message, action 314, for the calling party over the call with the calling party, which allows in action 316 the recording of the voice message from the calling party on the UE using the UE's voicemail client. Finally, the UE client alerts, in action 318, the user of the UE about the newly deposited voicemail message, using the UE's voicemail client (e.g. via a sound, a sign on the GUI of the UE, etc). Such alerting may include a vibration of the UE, or a display of one or more signs on the graphical user Interface (GUI) of the UE indicating the presence of a voicemail message.

The voicemail message is deposited locally on the UE itself, which enables an easy retrieval of the message with no further network signalling. Similarly, the local recording of the voicemail messages enables an easier display, sorting, and accessing to the message, and voicemail message management becomes a purely local feature, on the UE itself.

In some further embodiments, during the recording of the voice message, the called party user may become available (for example, because completing and hanging up another call) and may answer the incoming call from the calling party. The method then determines when the call is answered by the called party user during the recording of the voice mail message and transfers the call from the voicemail client of the UE to the call client of the UE, and enables the user to speak to the calling party. In some embodiments, the voicemail client and the call client are part of the same functionality of the UE, in which case the same behavior can be implemented where the call is transferred from the voicemail functionality to the call functionality of the same client.

In some other embodiments, the method requires the configuring the voicemail client of the UE to answer incoming calls not answered by the user, before the expiry of the pre-set no-answer period of time, to avoid the incoming calls being routed to the network-based voicemail server.

In yet further embodiments, configuring the voicemail client of the UE comprises obtaining from the network-based voicemail server the pre-set no-answer period of time, or a period of time just shorter. This may be achieved by the user calling a support line of the operator or the UE itself being configured to handshake with the network the pre-set period of time, or the period of time just shorter. For example, the voicemail client of the UE may be manually configured with the pre-set no-answer period of time or with the shorter period of time.

Configuring the voicemail client of the UE may involve the UE being provisioned with a period of time smaller than the pre-set no-answer period of time at which expiry the call is to be answered by the UE's call client if the call is not answered by the user. This may be achieved via manual configuration or via handshaking with a network-based voicemail server.

In other embodiments, the method comprises displaying the voicemail message in a visual voicemail inbox of the UE.

FIG. 4 shows a nodal operation and signal flow diagram of an exemplary embodiment of the invention which may be implemented using any communications protocol, including but being not limited to GSM (Global System of Mobile Communications), IMS (IP Multimedia Subsystem), VoIP (Voice over Internet protocol), etc. Furthermore, such embodiment may be implemented using any type of calls, include but being not limited to voice calls, video calls, etc.

In action 410, an incoming call is being initiated from a calling party 402, towards a called party UE 200 possible via possibly some switch(es), router(s), or MSC('s) 403. Such call may be implemented via various communications protocols, such as for example but not limited to GSM, IMS/SIP, etc. For example, receiving the incoming call message 412 may comprise receiving a call page from the MSC, if the protocol used is GSM, or receiving a Session Initiation Protocol (SIP) INVITE message from a SIP media centre if the protocol used is SIP. The alerting (or indication to alert) of the incoming call is sent towards the called party UE 200 in action 412, which triggers an incoming call alert for the UE 200 in action 414, which may take the form of a sound, a vibration, or a displayed notification of some sort. A timer 413 is usually started around the initiation of receipt of the call message 412 so that the no-answer period of time can be monitored, either by the node 403 or the called party 200, as the call is set to be routed to a voicemail server (not shown in FIG. 4) after the expiry of a no-answer pre-set period of time, if the called party does not answers the call during such time.

If the user of the UE 200 does not answer the call, the voicemail client of the UE is configured to pick-up the call before the expiry of the pre-set period of time, action 416. This means that the time associated to action 413 does not expire or reach the pre-set period of time, and the call is not established towards the network-based voicemail server (not shown in FIG. 4). Rather, the call is established in action 418 between the calling party and the called party UE 200 voicemail client, which enables in action 420 the voicemail client to play a greeting for the calling party, just as a network-based VM server would do, and allow the calling party to deposit a voicemail message onto the UE's voicemail client. Then, if the user has not picked up the call during the greeting message or the recording of action 420, as determined in action 421 with negative outcome, the user of the UE 200 may access the deposited message, for example via the voicemail client of the UE, action 422. Otherwise, if in action 421 it is determined the user picks up the call during the voicemail client handling of the incoming call, the call is transferred from the voice mail client to the phone client of the UE 200, enabling the user to handle the live call with the calling party, action 423. In some embodiments, the voicemail client and the call client are part of the same functionality of the UE, in which case the same behavior of action 423 may be implemented where the call is transferred from the voicemail functionality to the call functionality of the same client, still enabling the user of the UE 200 to pick up the live call.

FIG. 5 shows a high-level block diagram according to further embodiments and generalizations according to the invention herein. Such embodiments may be implemented in a UE running a voicemail client or app as described hereinbefore, such as for example in a smartphone, tablet, PC, laptop or any sort of computerized device that can manage voice or video calls, using any type of communications protocol. The node 200 (smartphone, PC, laptop, tablet or the likes) includes a GUI 502 in the form, for example, of a screen, and circuitry 504 enabling the implementation and operation of the voicemail client as described hereinbefore. Such a circuitry may further include a processor 506 and memory 508 storing instructions that when executed by the processor 506 cause the node 200 to operate according to the description hereinbefore.

In particular, the node 200 circuitry 504 is configured to support calls, and to receive in particular an incoming call message causing a UE's client to alert about the incoming call for at most a pre-set no-answer period of time, after which, if the call is not answered, the call being set to be completed from the calling party towards a network-based voicemail centre. The circuitry is further configured to have the incoming call to be answered by a voicemail client (also called voicemail app) 505, before the expiry of the pre-set no-answer period of time, causing the call to be established between the calling party and the UE's voicemail client 505, wherein the call is not completed towards the network-based voicemail centre, The circuitry is further configured to cause a greeting message to be played for the calling party by the voicemail client 505 over the call with the calling party, record a voice message from the calling party on the UE using the UE's voicemail client, and alert the user of the UE about the voicemail message, using the UE's voicemail client.

Embodiments of the present invention provide an advantageous solution that enables better and more efficient and more flexible voicemail management in a UE such as for example a smartphone, PC, laptop or tablet while also reducing the network-based signaling associated with the management of the voicemail messages in network-based implementations of voicemail system.

Based upon the foregoing, it should now be apparent to those of ordinary skills in the art that embodiments of the present invention provide an advantageous solution, which offers easy and efficient voicemail messaging. Although the system and method of the present invention have been described in particular reference to certain radio telecommunications messaging standards, it should be realized upon reference hereto that the innovative teachings contained herein are not necessarily limited thereto and may be implemented advantageously with any applicable radio telecommunications standard. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow. Just as an example, while the description of certain embodiments was made with reference to a voicemail client, voicemail application, or voicemail system, it is understood that such embodiments may also handle videomails or video messages in a similar way. Voice message is also to be understood as a message containing at least voice, but possibly containing also video or other media.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. In a User Equipment (UE) comprising circuitry enabling handling of phone calls, a method for voicemail service comprising the steps of:
   a. receiving an incoming call message causing a UE's call client to alert about the incoming call for at most a pre-set no-answer period of time, after which, if the call is not answered, the call being set to be completed from the calling party to a network-based voicemail center;
   b. when the UE is turned on, before the expiry of the pre-set no-answer period of time, answering the incoming call by a voicemail client of the UE, causing the call to be established between the calling party and the UE's voicemail client, wherein the call is not completed to the network-based voicemail center;
   c. playing a greeting message for the calling party by the voicemail client over the call with the calling party;
   d. recording a voice message from the calling party on the UE using the UE's voicemail client; and
   e. alerting the user of the UE of the voicemail message.

2. The method of claim 1, wherein the step of recording the voice message further comprises the steps of:
   d.1. determining when the call is answered by the user during the playing of the greeting message or the recording of the voicemail message, and
   d.2. transferring the call from the voicemail client of the UE and enabling the user to speak to the calling party.

3. The method of claim 1, wherein:
receiving the incoming call message comprises receiving a call page from a Mobile Switching Center (MSC); and
alerting about the incoming call comprises playing a ringing sound or generating a vibration by the UE.

4. The method of claim 1, wherein receiving an incoming call message comprises receiving a Session Initiation Protocol (SIP) INVITE message from a SIP media center.

5. The method of claim 1, wherein the method comprises, before step a., the step of:
g. configuring the voicemail client to answer incoming calls not answered by the user, before the expiry of the pre-set no-answer period of time, to avoid the incoming calls being routed to the network-based voicemail server.

6. The method of claim 5, wherein the step of configuring the voicemail client of the UE comprises the step of obtaining from the network-based voicemail server the pre-set no-answer period of time.

7. The method of claim 5, wherein the step of configuring the voicemail client of the UE comprises manually configuring the pre-set no-answer period of time.

8. The method of claim 6, wherein the step of configuring the voicemail client of the UE comprises the step of configuring a period of time smaller than the pre-set no-answer period of time at which expiry the call is to be answered by the UE's call client if the call is not answered by the user.

9. The method of claim 1, further comprising the step of displaying the voicemail message in a visual voicemail inbox of the UE.

10. The method of claim 9, further comprising the step of downloading from the network-based voicemail center other voicemail messages deposited onto the network-based voicemail center, during a period of time the UE was turned off or otherwise unreachable, wherein the step of displaying comprises displaying the voicemail message in the visual voicemail inbox of the UE along with the other voicemail messages.

11. The method of claim 1, wherein the UE's voicemail client is part of the operating system of the UE.

12. The method of claim 1, wherein the UE's voicemail client is an app running on top of the operating system of the UE.

13. The method of claim 1 wherein the UE is a smartphone, a PC, a laptop, a tablet or a computer device.

14. A user Equipment (UE) comprising circuitry configured to handle phone calls, the UE being configured to:
receive an incoming call message causing a UE's call client to alert about the incoming call for at most a pre-set no-answer period of time, after which, if the call is not answered, the call being set to be completed from the calling party towards a network-based voicemail center;
when the UE is turned on, before the expiry of the pre-set no-answer period of time, answer the incoming call by a voicemail client of the UE, causing the call to be established between the calling party and the UE's voicemail client, wherein the call is not completed towards the network-based voicemail center;
play a greeting message for the calling party by the voicemail application over the call with the calling party;
record a voice message from the calling party on the UE using the UE's voicemail client; and
alert the user of the UE about the voicemail message.

15. The UE of claim 14, wherein to record the voice message the UE further:
determines when the call is answered by a user, and
transfers the call from the voicemail client of the UE to enable the user to speak to the calling party.

16. The UE of claim 14, wherein:
receiving the incoming call message comprises receiving a call page from a Mobile Switching Center (MSC); and
to alert about the incoming call comprises playing a ringing sound or generating a vibration by the UE.

17. The UE of claim 14, wherein receiving the incoming call message comprises receiving a Session Initiation Protocol (SIP) INVITE message from a SIP media center.

18. The UE of claim 14, wherein before receiving the incoming call message, the voicemail client of the UE is configured to answer incoming calls not answered by the user before the expiry of the pre-set no-answer period of time, to avoid the incoming calls being routed to the network-based voicemail server.

19. The UE of claim 18, wherein for configuring the voicemail client of the UE, the UE is provisioned from the network-based voicemail server with the pre-set no-answer period of time.

20. The UE of claim 18, wherein the voicemail client of the UE is manually configured with the pre-set no-answer period of time.

21. The UE of claim 18, wherein for configuring the voicemail client of the UE, the UE is provisioned with a period of time smaller than the pre-set no-answer period of time at which expiry the call is to be answered by the UE's call client if the call is not answered by the user.

22. The UE of claim 15, wherein the UE is further adapted to display an indication of the voicemail message in a visual voicemail inbox of the UE.

23. The UE of claim 15, wherein the UE downloads from the network-based voicemail center other voicemail messages deposited onto the network-based voicemail center during a period of time the UE was turned off or otherwise unreachable, wherein displaying comprises displaying the voicemail message in the visual voicemail inbox of the UE along with the other voicemail messages.

24. The UE of claim 15, wherein the UE's voicemail client is part of the operating system of the UE.

25. The method of claim 15, wherein the UE's voicemail client is an app running on top of the operating system of the UE.

* * * * *